United States Patent
Tang

(10) Patent No.: US 10,873,990 B2
(45) Date of Patent: Dec. 22, 2020

(54) METHOD AND DEVICE FOR RECEIVING AND PROCESSING DATA OF RADIO LINK CONTROL LAYER

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 41 days.

(21) Appl. No.: 16/354,930

(22) Filed: Mar. 15, 2019

(65) Prior Publication Data
US 2019/0215902 A1    Jul. 11, 2019

Related U.S. Application Data

(63) Continuation of application No. PCT/CN2017/085079, filed on May 19, 2017.

(51) Int. Cl.
*H04W 80/02* (2009.01)
*H04W 48/08* (2009.01)
(Continued)

(52) U.S. Cl.
CPC .......... *H04W 80/02* (2013.01); *H04L 1/1621* (2013.01); *H04L 1/1841* (2013.01);
(Continued)

(58) Field of Classification Search
CPC ..... H04W 80/02; H04W 28/06; H04W 48/08; H04W 76/10; H04L 47/34; H04L 1/841; H04L 1/1848; H04L 1/1621
See application file for complete search history.

(56) References Cited

U.S. PATENT DOCUMENTS

2005/0270996 A1*  12/2005  Yi ........................ H04L 1/1841
                                                        370/312
2008/0043651 A1   2/2008  Okamoto et al.
(Continued)

FOREIGN PATENT DOCUMENTS

CN    1951052 A    4/2007
CN    101030839 A    9/2007
(Continued)

OTHER PUBLICATIONS

International Search Report for PCT/CN2017/085079 with translation from WIPO, dated Feb. 22, 2018.
(Continued)

*Primary Examiner* — Curtis A Alia
(74) *Attorney, Agent, or Firm* — Ladas & Parry, LLP

(57) ABSTRACT

The present application provides a method and a device for receiving and processing data of a radio link control (RLC) layer, where the method includes: receiving a RLC protocol data unit (PDU); when a data field of the target RLC PDU merely comprises a segment of a complete RLC service data unit (SDU), processing the target RLC PDU or discarding the RLC PDU according to a current operating state of a re-assembly timer corresponding to a value of a sequence number (SN) comprised in the target RLC PDU, where the target RLC PDU is one of a plurality of RLC PDUs, the plurality of RLC PDUs has SNs of a same value, and the plurality of RLC PDUs is capable of being re-assembled into the complete RLC SDU, and the current operating state is one of the following operating states: non-activated state, counting state and expired state.

10 Claims, 3 Drawing Sheets

(51) Int. Cl.
*H04L 1/18* (2006.01)
*H04L 1/16* (2006.01)
*H04W 28/06* (2009.01)
*H04L 12/801* (2013.01)
*H04W 76/10* (2018.01)

(52) U.S. Cl.
CPC ............ *H04L 1/1848* (2013.01); *H04L 47/34* (2013.01); *H04W 28/06* (2013.01); *H04W 48/08* (2013.01); *H04W 76/10* (2018.02)

(56) References Cited

U.S. PATENT DOCUMENTS

| | | | | |
|---|---|---|---|---|
| 2008/0259832 | A1* | 10/2008 | Tseng | H04L 47/27 370/310 |
| 2010/0189059 | A1* | 7/2010 | Yang | H04L 1/1809 370/329 |
| 2011/0164560 | A1* | 7/2011 | Ki | H04L 1/1874 370/328 |
| 2016/0164793 | A1* | 6/2016 | Basu Mallick | H04W 28/08 370/235 |
| 2019/0174575 | A1* | 6/2019 | Shah | H04W 76/15 |

FOREIGN PATENT DOCUMENTS

| | | |
|---|---|---|
| CN | 101478380 A | 7/2009 |
| CN | 102751904 A | 10/2012 |
| CN | 106411478 A | 2/2017 |
| CN | 107113658 A | 8/2017 |
| WO | 2016080877 A1 | 5/2016 |
| WO | 2018209682 | 11/2018 |

OTHER PUBLICATIONS

Written Opinion PCT/CN2017/085079 with translation from Google translate, dated Feb. 22, 2018.
Nokia et al., "3GPPTSG-RAN WG 2 Meeting #95bis R2-166355", Segmentation in NR, Oct. 14, 2016.
3GPP TSG-RAN2 #97bis R2-1702547 Spokane, USA, Apr. 3-7, 2017.
OPPO, "3GPPTSG-RAN 2 Meeting#98 R2-1704056", The SN ofRLC UMC PDU, May 5, 2017.
3GPP TSG-RAN WG2 Meeting #97 R2-1701735 Athens, Greece, Feb. 13-17, 2017.
Extended European Search Report from EP App No. 17909724.1, dated Sep. 16, 2019.
The first OA and search report from the parallel CN application No. 201780053232.5 dated Dec. 24, 2019.

* cited by examiner

METHOD AND DEVICE FOR RECEIVING AND PROCESSING DATA OF RADIO LINK CONTROL LAYER

CROSS-REFERENCE TO RELATED APPLICATIONS

This application is a continuation of International Application No. PCT/CN2017/085079, filed on May 19, 2017, entitled "METHOD AND DEVICE FOR RECEIVING AND PROCESSING DATA OF RADIO LINK CONTROL LAYER", the content of which is incorporated herein by reference in its entirety.

TECHNICAL FIELD

Embodiments of the present application relates to the field of communications, and more particularly, to a method and a device for receiving and processing data of a radio link control layer.

BACKGROUND

The following three modes are supported by a radio link control (RLC) layer in communication system: transparent mode (TM), unacknowledged mode (UM) and acknowledged mode (AM). In the TM mode, a RLC entity delivers a service data unit (SDU) from a packet data convergence protocol (PDCP) layer directly to a medium access control (MAC) layer without any processing. In the UM mode, a RLC receiving side does not provide any feedback for a received RLC protocol data unit (PDU). In the AM mode, the RLC receiving side provides an acknowledgment feedback for a received RLC PDU.

In the long term evolution (LTE) system, an in-sequence delivery of a RLC SDU is required for the RLC receiving side in both the UM mode and the AM mode, which is achieved mainly through a sequence number (SN) in a header of the RLC PDU and an ordering window of the RLC receiving side. A SN is carried by a header of each RLC PDU, where the size of the ordering window of the receiving side is affected by the length of the SN carried in the header of the RLC PDU, for example, if SN=5 bits, the size of the ordering window maintained by the receiving side will be $2^5/2$. An ordering window corresponds to a reordering timer. Generally, if a SN value of a received RLC PDU does not fall within the ordering window (or although it falls within the ordering window, a RLC PDU corresponding to a SN whose value is less than the SN value of this received RLC PDU is not received), the reordering timer is activated, and a corresponding RLC PDU is discarded when the timer expires.

In the new radio (NR) system, a RLC layer (in UM mode and the AM mode) will not support a function of SDU concatenation any more, but still have a function of SDU segmentation.

Accordingly, it is desired to provide a method for receiving and processing data of a radio link control layer to meet the needs of a new wireless communication system, and to simplify the implementation of the communication system.

SUMMARY

The present application provides a method for receiving and processing data of a radio link control layer to meet the needs of a new wireless communication system, and to simplify the implementation of the communication system.

In a first aspect, a method for receiving and processing data of a radio link control layer is provided, including: receiving a target radio link control (RLC) protocol data unit (PDU); when a data field of the target RLC PDU merely includes a segment of a complete RLC service data unit (SDU), processing the target RLC PDU or discarding the RLC PDU according to a current operating state of a re-assembly timer corresponding to a value of a sequence number (SN) included in the target RLC PDU, where the target RLC PDU is one of a plurality of RLC PDUs, the plurality of RLC PDUs has SNs of a same value, and the plurality of RLC PDUs is capable of being re-assembled into the complete RLC SDU, and the current operating state is one of the following operating states: non-activated state, counting state and expired state.

With the method for receiving and processing data of the radio link control layer according to the present application, in the case that the receiving device determines that a data field of a received RLC PDU merely includes a complete RLC SDU, it processes the RLC PDU or discard the RLC PDU according to a current operating state of a re-assembly timer corresponding to a value of a sequence number (SN) included in the received RLC PDU, which is applicable to a wireless communication system not supporting SDU concatenation and in-sequence delivery, and can simplify the implementation of a communication system.

With the first aspect, in an implementation manner of the first aspect, the method further includes: when the data field of the target RLC PDU merely includes the complete RLC SDU, re-assembling the target RLC PDU, where the target RLC PDU does not include a SN.

With the first aspect and the preceding implementation manner, in another implementation manner of the first aspect, the method further includes: determining the re-assembly timer according to the value of the SN included in the target RLC PDU.

Different values of SNs correspond to different re-assembly timers, and the receiving device is required to maintain a plurality of re-assembly timers.

With the first aspect and the preceding implementation manners, in yet another implementation manner of the first aspect, the current operating state of the re-assembly timer is non-activated state;

where the processing the target RLC PDU according to the current operating state of the re-assembly timer corresponding to the value of the sequence number (SN) included in the target RLC PDU includes: activating the re-assembly timer; and when it is determined that the re-assembly timer is expired, discarding a RLC PDU that has been received before the time that the re-assembly timer get expired among the plurality of RLC PDUs, where the RLC PDU that has been received includes the target RLC PDU.

With the first aspect and the preceding implementation manners, in yet another implementation manner of the first aspect, determining that the target RLC PDU is the first received RLC PDU among the plurality of RLC PDUs.

With the first aspect and the preceding implementation manners, in yet another implementation manner of the first aspect, determining that the segment included in the data field of the target RLC PDU is not adjacent to a segment included in a data field of any RLC PDU received before a receiving time of the target RLC PDU among the plurality of RLC PDUs.

With the first aspect and the preceding implementation manners, in yet another implementation manner of the first aspect, the current operating state of the re-assembly timer is counting state;

where the processing the target RLC PDU according to the current operating state of the re-assembly timer corresponding to the value of the sequence number (SN) included in the target RLC PDU includes: when it is determined that other RLC PDU, except for the target RLC PDU, among the plurality of RLC PDUs have been received before the target RLC PDU is received, re-assembling the plurality of RLC PDUs and ending the re-assembly timer.

With the first aspect and the preceding implementation manners, in yet another implementation manner of the first aspect, when it is determined that merely part of RLC PDU, except for the target RLC PDU, among the plurality of RLC PDUs have been received before the target RLC PDU is received, determining whether the re-assembly timer is expired;

when it is determined that the re-assembly timer is expired, discarding a RLC PDU that have been received before the re-assembly timer get expired among the plurality of RLC PDUs, where the RLC PDU that has been received includes the target RLC PDU.

With the first aspect and the preceding implementation manners, in yet another implementation manner of the first aspect, before the processing the target RLC PDU according to the current operating state of the re-assembly timer corresponding to the value of the sequence number (SN) included in the target RLC PDU, where the method further includes: storing the target RLC PDU in a buffer.

With the first aspect and the preceding implementation manners, in yet another implementation manner of the first aspect, before storing the target RLC PDU in the buffer, the method further includes: determining that the target RLC PDU is received for the first time.

With the first aspect and the preceding implementation manners, in yet another implementation manner of the first aspect, the current operating state of the re-assembly timer is expired state;

where the processing the target RLC PDU according to the current operating state of the re-assembly timer corresponding to the value of the sequence number (SN) included in the target RLC PDU includes: discarding the target RLC PDU.

With the first aspect and the preceding implementation manners, in yet another implementation manner of the first aspect, before discarding the target RLC PDU, the method further includes: determining that the target RLC PDU is not received for the first time.

In a second aspect, a device is provided to perform the method according to the first aspect or any of the possible implementation manners of the first aspect. Specifically, the device includes a function module for performing the method according to the first aspect or any of the possible implementation manners of the first aspect.

In a third aspect, a device including a processor, a memory and a transceiver is provided, where the processor, the memory and the transceiver communicate with each other via an internally connected path to transfer a control and/or data signal, such that the device performs the method according to the first aspect or any of the possible implementation manners of the first aspect.

In a fourth aspect, there is provided a computer readable medium for storing a computer program, where the computer program includes instructions for performing the method according to the first aspect or any of the possible implementation manners of the first aspect.

In a fifth aspect, there is provided a computer program product including instructions which, when executed by a computer, cause the computer to perform the method for receiving and processing data of a radio link control layer according to the first aspect or any of the possible implementation manners of the first aspect. In particular, the computer program product may be executed on the device according to the second aspect or the third aspect.

DESCRIPTION OF EMBODIMENTS

The technical solutions of embodiments of the present application will be clearly and comprehensively described in the following with reference to the accompanying drawings.

It should be understood that technical solutions of embodiments of the present application may be applied to various communication systems, such as a global system of mobile communication (GSM) system, a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD), an universal mobile telecommunication system (UMTS) or a worldwide interoperability for microwave access (WiMAX) communication system, a 5G system, or a new radio (NR) system.

In embodiments of the present application, a receiving device may be a network device or a terminal device.

In embodiments of the present application, the terminal device may include, but is not limited to, a mobile station (MS), a mobile terminal, a mobile telephone, an user equipment (UE), a handset and a portable equipment, a vehicle, etc., where the terminal device can communicate with one or more core networks via a radio access network (RAN), for example, the terminal device may be a mobile telephone (or referred to as a "cellular" telephone), a computer having a function of wireless communication and the like, the terminal device may also be a mobile device that is portable, pocket, handheld, computer-included, or car-mounted.

The network device according to the present application is a device deployed in the radio access network to provide a function of wireless communication for a terminal device. The network device may be a base station, which may include various forms of a macro base station, a micro base station, a relay, an access point and the like. In systems employing different radio access technologies, the name of a device having the function of base station may vary. For example, in an LTE network, it is referred to as an evolved NodeB (eNB or eNodeB), while in a 3rd Generation (3G) network, it is referred to as a Node B. The network device may also be core network device.

Figure 1:
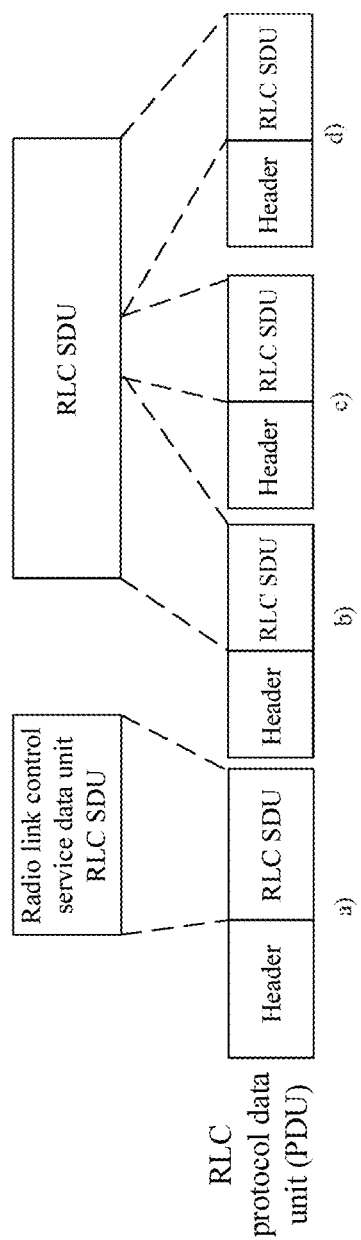
FIG. 1 is a schematic diagram of a RLC PDU according to an embodiment of the present application.

In a new radio (NR) system, the acknowledged mode (AM) and the unacknowledged mode (UM) of a RLC layer will not support a function of service data unit (SDU) concatenation any more, but still retain a function of SDU segmentation. This means that, for a NR RLC PDU, there will be merely the following four cases as shown in FIG. 1: a) a RLC PDU includes only one complete RLC SDU; b) a RLC PDU includes only one segmentation of a RLC SDU, where the segmentation is located in the front of the RLC SDU; c) a RLC PDU includes only one segmentation of a RLC SDU, where the segmentation is located in the middle of the RLC SDU; and d) a RLC PDU includes only one segmentation of a RLC SDU, where the segmentation is located in the back of the RLC SDU. Beside, the NR RLC UM and NR RLC AM will no longer support in-sequence delivery of a SDU.

A method used in an LTE system for receiving and processing data of a RLC layer is not suitable for a NR system. Therefore, it is necessary to provide a method for receiving and processing data of a RLC layer applicable to a new wireless communication system, and to simplify the implementation of the communication system.

Figure 2:
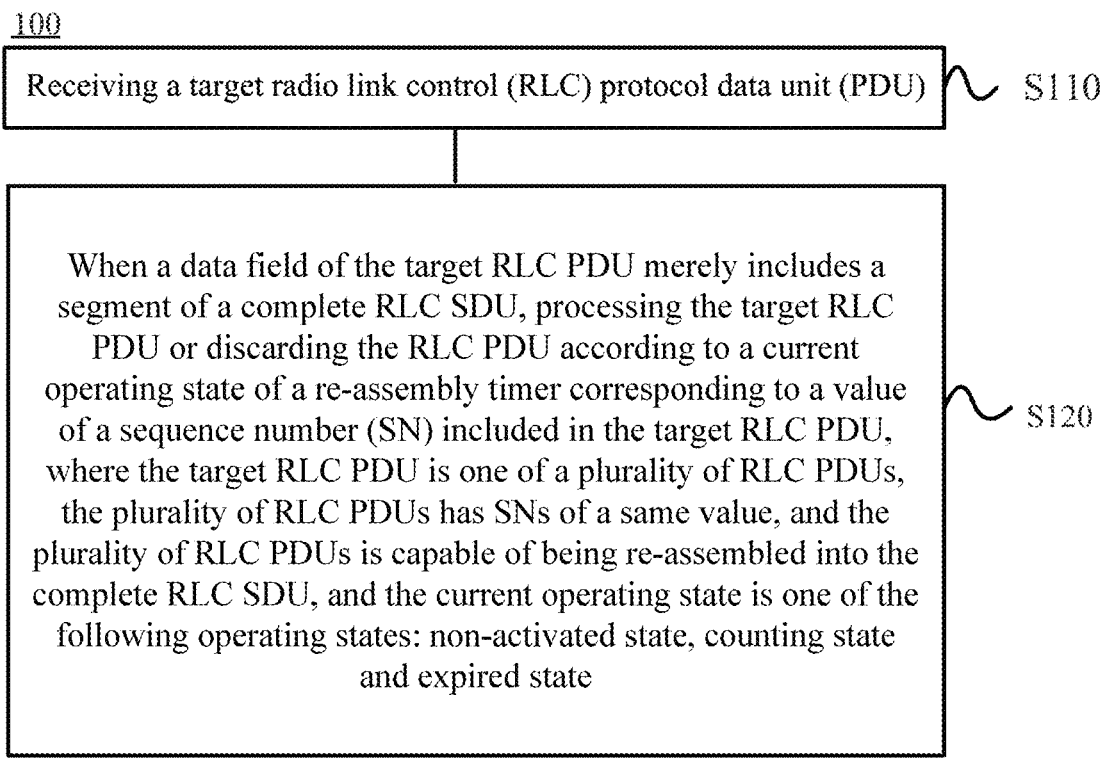
FIG. 2 is a schematic flowchart of a method for receiving and processing data of a radio link control layer according to an embodiment of the present application.

FIG. 2 illustrates a method 100 for receiving and processing data of a radio link control layer according to an embodiment of the present application, where the method may be performed by a receiving device. As shown in FIG. 2, the method 100 includes:

S110, receiving a target radio link control (RLC) protocol data unit (PDU); and

S120, when a data field of the target RLC PDU merely includes a segment of a complete RLC SDU, processing the target RLC PDU or discarding the RLC PDU according to a current operating state of a re-assembly timer corresponding to a value of a sequence number (SN) included in the target RLC PDU, where the target RLC PDU is one of a plurality of RLC PDUs, the plurality of RLC PDUs has SNs of a same value, and the plurality of RLC PDUs is capable of being re-assembled into the complete RLC SDU, and the current operating state is one of the following operating states: non-activated state, counting state and expired state.

It should be noted that a segmentation of a complete RLC SDU may be construed as a part among a plurality of parts obtained after the complete RLC SDU being segmented.

In an embodiment of the present application, the following can be agreed in advance between a transmitting device and the receiving device: when a data field of a RLC PDU includes only a complete RLC SDU, then a SN is not required in the RLC PDU, a target RLC PDU is re-assembled directly after being received by the receiving device. When a data field of a RLC PDU includes only a segmentation of a complete RLC PDU, a SN is required in the RLC PDU. Additionally, a plurality of RLC PDUs whose data fields include different segmentations of a complete RLC SDU have the same value of SNs.

For example, a complete RLC SDU is segmented into the three segmentations, i.e., a segmentation 1, a segmentation 2 and a segmentation 3 respectively, where the segmentation 1 is located in the front of the complete RLC SDU, the segmentation 2 is located in the middle of the complete RLC SDU, and the segmentation 3 is located in the back of the complete RLC PDU. Three RLC PDUs are required to be generated by the transmitting device, i.e., a RLC PDU 1 whose data field includes the segmentation 1, a RLC PDU 2 whose data field includes the segmentation 2 and a RLC PDU 3 whose data field includes the segmentation 3, where values of SNs in the three RLC PDUs are the same.

Furthermore, the length of a SN may be same as the length of a SN in the prior art. For example, there may be two types of lengths for a SN: 5 bits and 10 bits, where the transmitting device determines and selects the length for the SN to be 5 bits or 10 bits according to transmission requirements of data carried in the RLC SDU. Or, there is only one type of the length for the SN, that is, the length of the SN is not associated with the transmission requirements of the data carried in the RLC SDU. In this case, the length of the SN may be agreed in advance between the transmitting device and the receiving device. Alternatively, if the receiving device is a terminal device and the transmitting device is a network device, the length of the SN may be signaled to the terminal device by the network device over high layer signaling.

In an embodiment of the present application, the receiving device is provided with a plurality of re-assembly timers, where different values of SNs are corresponding to different re-assembly timers. The following may be agreed in advance between the receiving device and the transmitting device: when the receiving device determines that not all of RLC PDUs corresponding to a value of a SN have been received when a re-assembly timer corresponding to the value of the SN gets expired (or invalid), the receiving device will discard the RLC PDUs corresponding to the value of the SN that are received before the re-assembly timer gets expired; but when the receiving device determines that all of the RLC PDUs corresponding to the value of the SN have been received when the re-assembly timer corresponding to the value of the SN gets expired, the receiving device re-assembles all of the RLC PDUs and ends the re-assembly timer.

In an embodiment, in S120, when the current operating state of the re-assembly timer corresponding to the value of the SN included in the target RLC PDU is non-activated state when the target RLC PDU is received by the receiving device, it needs to be activated by the receiving device; when it is determined that the re-assembly timer is expired, a RLC PDU that has been received before the time that the re-assembly timer gets expired among the plurality of RLC PDUs is discarded, where the RLC PDU that has been received includes the target RLC PDU.

In particular, in some embodiments, determining that the target RLC PDU is the first received RLC PDU among the plurality of RLC PDUs before activating the re-assembly timer.

For example, a complete RLC SDU is segmented into the three segmentations, i.e., a segmentation 1, a segmentation 2 and a segmentation 3 respectively. Three RLC PDUs are required to be generated by the transmitting device, i.e., a RLC PDU 1 whose data field includes the segmentation 1, a RLC PDU 2 whose data field includes the segmentation 2 and a RLC PDU 3 whose data field includes the segmentation 3, where values of SNs in the three RLC PDUs are the same. If the RLC PDU 1 and the RLC PDU 3 are not received before the receiving device determining that the RLC PDU 2 is received, activating the re-assembly timer.

Alternatively, in particular, in some other embodiments, before activating the re-assembly timer, determining that the segment included in the data field of the target RLC PDU is not adjacent to a segment included in a data field of any RLC PDU received before a receiving time of the target RLC PDU among the plurality of RLC PDUs.

For example, assuming that a complete RLC SDU needs to be segmented into five segmentations that are adjacent to each other, which are a segmentation 1, a segmentation 2, a segmentation 3, a segmentation 4 and a segmentation 5. Five RLC PDUs are required to be generated by the transmitting device, which are a RLC PDU 1 whose data field includes the segmentation 1, a RLC PDU 2 whose data field includes the segmentation 2, a RLC PDU 3 whose data field includes the segmentation 3, a RLC PDU 4 whose data field includes the segmentation 4 and a RLC PDU 5 includes the segmentation 5. Assume that the target RLC PDU is the RLC PDU 4. If the receiving device has received the RLC PDU 1 and the RLC PDU 2 before the RLC PDU 4 is received, where the segmentation in the RLC PDU 4 is not adjacent to the segmentation in the RLC PDU 1 or the segmentation in the RLC PDU 2, the receiving device activates the re-assembly timer. If the receiving device has received the RLC PDU 1, RLC PDU 2 and RLC PDU 3 before the RLC PDU 4 is received, then the re-assembly timer won't be activated.

In an embodiment, in S120, when the current operating state of the re-assembly timer corresponding to the value of the SN included in the target RLC PDU is counting state when the target RLC PDU is received by the receiving device, the receiving device determines whether other RLC PDU, except for the target RLC PDU, among the plurality of RLC PDUs have been received before the target RLC PDU is received. When it is determined that other RLC PDUs, except for the target RLC PDU, among the plurality of RLC PDUs have been received before the target RLC PDU is received, re-assemble the plurality of RLC PDUs and end the re-assembly timer. When it is determined that merely part of RLC PDU, except for the target RLC PDU, among the plurality of RLC PDUs have been received before the target RLC PDU is received, the receiving device determines whether the re-assembly timer is expired; when it is determined that the re-assembly timer is expired, discards a RLC PDU that has been received before the re-assembly timer get expired among the plurality of RLC PDUs, where the RLC PDU that has been received includes the target RLC PDU.

In all the foregoing embodiments, before processing the target RLC PDU according to the current operating state of the re-assembly timer corresponding to the value of the sequence number (SN) included in the target RLC PDU, the receiving device stores the target RLC PDU in a buffer.

Furthermore, the receiving device determines whether the target RLC PDU is received for the first time, or determines whether the target RLC PDU is a duplicate PDU. When it is determined that the target RLC PDU is received for the first time, stores the target RLC PDU in a buffer, otherwise discards the target RLC PDU.

In an embodiment, in S120, when the current operating state of the re-assembly timer corresponding to the value of the SN included in the target RLC PDU is expired state when the target RLC PDU is received by the receiving device, the target RLC PDU is discarded by the receiving device directly.

Figure 3:
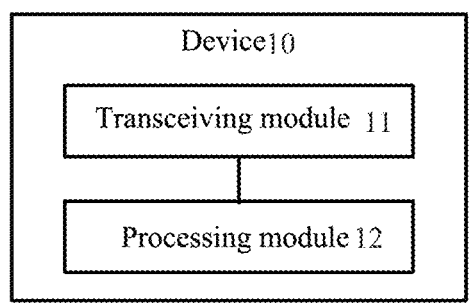
FIG. 3 is a schematic block diagram of a device according to an embodiment of the present application.

The above detailed description taken in conjunction with FIG. 1 and FIG. 2 illustrates the method for receiving and processing data of a radio link control layer according to embodiments of the present application. Referring to FIG. 3, a device according to an embodiment of the present application will be described in detail below. As shown in FIG. 3, a device 10 includes:

a transceiving module 11, configured to receive a target radio link control (RLC) protocol data unit (PDU); and a processing module 12, configured to: when a data field of the target RLC PDU merely includes a segment of a complete RLC service data unit (SDU), process the target RLC PDU or discard the RLC PDU according to a current operating state of a re-assembly timer corresponding to a value of a sequence number (SN) included in the target RLC PDU, where the target RLC PDU is one of a plurality of RLC PDUs, the plurality of RLC PDUs has SNs of a same value, and the plurality of RLC PDUs is capable of being re-assembled into the complete RLC SDU, and the current operating state is one of the following operating states: non-activated state, counting state and expired state.

Therefore, in the case that the device according to embodiments of the present application determines that a data field of a received RLC PDU merely includes a complete RLC SDU, it processes the RLC PDU or discard the RLC PDU according to a current operating state of a re-assembly timer corresponding to a value of a sequence number (SN) included in the received RLC PDU, which is applicable to a wireless communication system not supporting SDU concatenation and in-sequence delivery, and can simplify the implementation of a communication system.

In an embodiment of the present application, the processing module 12 is further configured to: when it is determined that the data field of the target RLC PDU merely includes the complete RLC SDU, re-assemble the target RLC PDU, where the target RLC PDU does not include a SN.

In an embodiment of the present application, the processing module 12 is further configured to: determine the re-assembly timer according to the value of the SN included in the target RLC PDU.

In an embodiment of the present application, the current operating state of the re-assembly timer is non-activated state;

where the processing module 12 is specifically configured to:

activate the re-assembly timer; and when it is determined that the re-assembly timer is expired, discards a RLC PDU that has been received before the time that the re-assembly timer get expired among the plurality of RLC PDUs, where the RLC PDU that has been received includes the target RLC PDU.

In an embodiment of the present application, the processing module 12 is further configured to: before activating the re-assembly timer, determine that the target RLC PDU is the first received RLC PDU among the plurality of RLC PDUs.

In an embodiment of the present application, the processing module 12 is further configured to: before activating the re-assembly timer, determine that the segment included in the data field of the target RLC PDU is not adjacent to a segment included in a data field of any RLC PDU received before a receiving time of the target RLC PDU among the plurality of RLC PDUs.

In an embodiment of the present application, the current operating state of the re-assembly timer is counting state;

where the processing module 12 is specifically configured to: when it is determined that other RLC PDU, except for the target RLC PDU, among the plurality of RLC PDUs have been received by the transceiving module 11 before the target RLC PDU is received, re-assemble the plurality of RLC PDUs and end the re-assembly timer.

In an embodiment of the present application, the processing module 12 is further configured to:

when it is determined that merely part of RLC PDU, except for the target RLC PDU, among the plurality of RLC PDUs have been received before the target RLC PDU is received by the transceiving module 11, determine whether the re-assembly timer is expired;

when it is determined that the re-assembly timer is expired, discard a RLC PDU that has been received before the re-assembly timer get expired among the plurality of RLC PDUs, where the RLC PDU that has been received includes the target RLC PDU.

In an embodiment of the present application, the processing module 12 is further configured to: before processing the target RLC PDU according to the current operating state of the re-assembly timer corresponding to the value of the sequence number (SN) included in the target RLC PDU, store the target RLC PDU in a buffer.

In an embodiment of the present application, the processing module 12 is further configured to: before storing the target RLC PDU in the buffer, determine that the target RLC PDU is received for the first time.

In an embodiment of the present application, the current operating state of the re-assembly timer is expired state; where the processing module 12 is specifically configured to discard the target RLC PDU.

In an embodiment of the present application, before discarding the target RLC PDU, determine that the target RLC PDU is not received for the first time.

The device according to embodiments of the present application may refer to the procedure of the method 100 according to the embodiments of the present application, and each of the units/modules and the other operations and/or functions described above performs a corresponding procedure in the method 100, which are not repeated herein for the sake of brevity.

Figure 4:
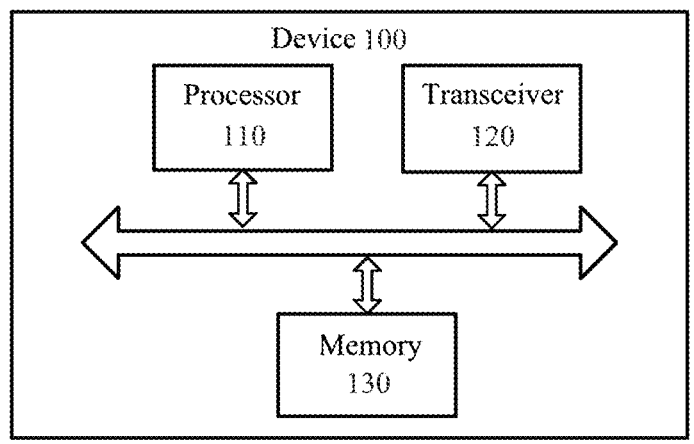
FIG. 4 is a schematic block diagram of a device according to another embodiment of the present application.

FIG. 4 illustrates a device according to another embodiment of the present application. As shown in FIG. 4, a device 100 includes a processor 110 and a transceiver 120, where the processor 110 is connected with the transceiver 120, in an embodiment, the device 100 further includes a memory 130, which is connected to the processor 110. The processor 110, memory 130 and the transceiver 120 may communicate with each other via an internally connected path. The transceiver 120 is configured to receive a target radio link control (RLC) protocol data unit (PDU); the processor 110 is configured to: when a data field of the target RLC PDU merely includes a segment of a complete RLC service data unit (SDU), process the target RLC PDU or discard the RLC PDU according to a current operating state of a re-assembly timer corresponding to a value of a sequence number (SN) included in the target RLC PDU, where the target RLC PDU is one of a plurality of RLC PDUs, the plurality of RLC PDUs has SNs of a same value, and the plurality of RLC PDUs is capable of being re-assembled into the complete RLC SDU, and the current operating state is one of the following operating states: non-activated state, counting state and expired state.

Therefore, in the case that the device according to embodiments of the present application determines that a data field of a received RLC PDU merely includes a complete RLC SDU, it processes the RLC PDU or discard the RLC PDU according to a current operating state of a re-assembly timer corresponding to a value of a sequence number (SN) included in the received RLC PDU, which is applicable to a wireless communication system not supporting SDU concatenation and in-sequence delivery, and can simplify the implementation of a communication system.

The device 100 according to embodiments of the present application may refer to the device 10 according to the embodiments of the present application, and each of the units/modules and the other operations and/or functions described above performs a corresponding procedure in the method 100, which are not repeated herein for the sake of brevity.

It should be understood that the processor according to embodiments of the present application may be an integrated circuit chip having a capability of signal processing. During the process of an implementation, each of the steps according to method embodiments described above can be achieved by a hardware integrated logic circuitry or instructions in the form of software in the processor. The above processor may be a general purpose processor, a digital signal processor (DSP), an application specific integrated circuit (ASIC), a field programmable gate array (FPGA) or other programmable logic device, discrete gate or transistor logic device, discrete hardware components. Each method, step and logic diagram disclosed in the embodiments of the present application may be implemented or performed. The general purpose processor may be a microprocessor or any conventional processor or the like. Steps of the method disclosed in the embodiments of the present application may be performed by a hardware decoding processor directly, or performed by a combination of hardware in the decoding processor and a software module. The software module may be located in a random access memory, a flash, a read-only memory, a programmable read-only memory or an electrically erasable programmable memory, a register or a storage medium well-known in the art. The storage medium is located in a memory, where the processor reads information in the memory and performs steps of the above method in combination with its hardware.

It should be noted that the memory according to the embodiments of the present invention may be a volatile memory or a non-volatile memory, or may include both of a volatile memory and a non-volatile memory. The non-volatile memory may be a read-only memory (ROM), a programmable ROM (ROM), an erasable PROM (EPROM), an electrically EPROM (EEPROM) or a flash. A volatile memory may be a random access memory (RAM), which acts as an external buffer. By way of example but not in a limiting sense, many forms of RAM may be used, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct Rambus RAM (DR RAM). It is noted that the memory in the system and method described herein are intended to include, but not limited to, these and any other suitable types of memory.

An embodiment of the present application further provides a computer program product including instructions which, when executed by a computer, cause the computer to perform the method for receiving and processing data of a radio link control layer according to the above method embodiment. In particular, the computer program product may be executed on the above device.

Those of ordinary skill in the art may understand that the units and algorithm steps illustrated in the embodiments disclosed herein can be implemented as an electrical hardware or a combination of computer software and an electrical hardware. Whether these functions are implemented in hardware or software depends on specific applications and design requirements of the technical solution. Although those of skill in the art may achieve the illustrated functions for each specific application in different ways, these implementations shall not be construed as falling out of the scope of the present application.

Those skilled in the art may clearly understand that, for the sake of convenience and brevity, specific operating process of the foregoing systems, devices, and units may refer to the corresponding process in the foregoing method embodiments, which are not repeated herein.

In the several embodiments provided herein, it should be understood that the embodiments, the disclosed systems, devices and methods may be implemented in other manners. For example, the device embodiments described above are merely illustrative, for example, the division of the units is merely a division of logical functions, there may be other ways for the division during implementations, for example, a plurality of units or components may be combined or integrated into another system, or some features may be ignored or not performed. Additionally, the illustrated or discussed couplings or direct couplings or communicative connections between each other may be via some interfaces, and indirect couplings or communicative connections between devices or units may be electrical, mechanical, or in other forms.

Units that are described as separated parts may be or may not be physically separated, parts displayed as units may be or may not be physical units, i.e. may be located in one place, or may be distributed to multiple network units. Part or all of the units may be selected according to actual needs to achieve the object of the solutions of the embodiments.

Further, each of the functional units in the various embodiments of the application may be integrated into a processing unit, or may be presented physically as separate units, or two or more units may be integrated into one unit.

When implemented in the form of a software functional unit and sold/used as an independent product, the described function may be stored in a computer readable storage medium. Based on such understanding, the technical solutions of the present application in nature or the part of the technical solutions contributing to the prior art may be embodied in a software product, where the computer software product is stored in a storage medium, including several instructions that enable a computer device (may be a personal computer, a server, or a network device) to perform all or part of the steps of the method according to each embodiments of the present application. The foregoing storage medium includes any medium that is capable of storing program codes, such as an USB flash disk, a mobile hard disk, a read-only memory (ROM), a random access memory (RAM), a magnetic disk, or a compact disk.

The foregoing description is only specific embodiments of the present application; however, the scope of the present application is not limited thereto, and person skilled in the art may readily consider variations or substitutions upon reading the technical solutions disclosed in the present application, which shall fall within the protection scope with the present application. Accordingly, the scope of the present application should be subject to the scope of the claims.

What is claimed is:

1. A method for receiving and processing data of a radio link control layer, comprising:
   receiving a target radio link control (RLC) protocol data unit (PDU); and
   when a data field of the target RLC PDU merely comprises a segment of a complete RLC service data unit (SDU), processing the target RLC PDU or discarding the target RLC PDU according to a current operating state of a re-assembly timer corresponding to a value of a sequence number (SN) comprised in the target RLC PDU, wherein the target RLC PDU is one of a plurality of RLC PDUs, the plurality of RLC PDUs has SNs of a same value, and the plurality of RLC PDUs is capable of being re-assembled into the complete RLC SDU, and the current operating state of the re-assembly timer is counting state;
   wherein the processing of the target RLC PDU according to the current operating state of the re-assembly timer corresponding to the value of the SN comprised in the target RLC PDU comprises:
   when it is determined that other RLC PDU, except for the target RLC PDU, among the plurality of RLC PDUs have been received before the target RLC PDU is received, re-assembling the plurality of RLC PDUs and ending the re-assembly timer,
   when it is determined that merely part of RLC PDU, except for the target RLC PDU, among the plurality of RLC PDUs have been received before the target RLC PDU is received, determining whether the re-assembly timer is expired, and when it is determined that the re-assembly timer is expired, discarding a RLC PDU that has been received before the re-assembly timer get expired among the plurality of RLC PDUs, wherein the RLC PDU that has been received comprises the target RLC PDU.

2. The method according to claim 1, wherein the method further comprises:
   when the data field of the target RLC PDU merely comprises the complete RLC SDU, re-assembling the target RLC PDU, wherein the target RLC PDU does not comprise a SN.

3. The method according to claim 1, wherein the method further comprises:
   determining the re-assembly timer according to the value of the SN comprised in the target RLC PDU.

4. The method according to claim 1, wherein before the processing the target RLC PDU according to the current operating state of the re-assembly timer corresponding to the value of the sequence number SN comprised in the target RLC PDU, the method further comprises:
   storing the target RLC PDU in a buffer.

5. The method according to claim 4, wherein before storing the target RLC PDU in the buffer, the method further comprises:
   determining that the target RLC PDU is received for the first time.

6. A device, comprising a processor, a transceiver and a memory, wherein:
   the transceiver is configured to receive a target radio link control (RLC) protocol data unit (PDU); and
   the memory has executable instructions stored thereon that when executed by the processor cause the processor to: when a data field of the target RLC PDU merely comprises a segment of a complete RLC service data unit (SDU), process the target RLC PDU or discard the target RLC PDU according to a current operating state of a re-assembly timer corresponding to a value of a sequence number (SN) comprised in the target RLC PDU, wherein the target RLC PDU is one of a plurality of RLC PDUs, the plurality of RLC PDUs has SNs of a same value, and the plurality of RLC PDUs is capable of being re-assembled into the complete RLC SDU, and the current operating state of the re-assembly timer is counting state;
   wherein the memory further has executable instructions stored thereon that when executed by the processor cause the processor to:
   when it is determined that other RLC PDU, except for the target RLC PDU, among the plurality of RLC PDUs have been received by the transceiver before the target RLC PDU is received, re-assemble the plurality of RLC PDUs and end the re-assembly timer,
   when it is determined that merely part of RLC PDU, except for the target RLC PDU, among the plurality of RLC PDUs have been received before the target RLC PDU is received by the transceiver, determine whether the re-assembly timer is expired, and when it is determined that the re-assembly timer is expired, discard a RLC PDU that has been received before the re-assembly timer get expired among the plurality of RLC PDUs, wherein the RLC PDU that has been received comprises the target RLC PDU.

7. The device according to claim 6, wherein the memory further has executable instructions stored thereon that when executed by the processor cause the processor to:
   when it is determined that the data field of the target RLC PDU merely comprises the complete RLC SDU, re-assemble the target RLC PDU, wherein the target RLC PDU does not comprise a SN.

8. The device according to claim 6, wherein the memory further has executable instructions stored thereon that when executed by the processor cause the processor to:
   determine the re-assembly timer according to the value of the SN comprised in the target RLC PDU.

9. The device according to claim 6, wherein the memory further has executable instructions stored thereon that when executed by the processor cause the processor to:
   before processing the target RLC PDU according to the current operating state of the re-assembly timer corresponding to the value of the sequence number SN comprised in the target RLC PDU, store the target RLC PDU in a buffer.

10. The device according to claim 9, wherein the memory further has executable instructions stored thereon that when executed by the processor cause the processor to:
    before storing the target RLC PDU in the buffer, determine that the target RLC PDU is received for the first time.

* * * * *